United States Patent
Zigel et al.

(10) Patent No.: US 7,822,605 B2
(45) Date of Patent: Oct. 26, 2010

(54) METHOD AND APPARATUS FOR LARGE POPULATION SPEAKER IDENTIFICATION IN TELEPHONE INTERACTIONS

(75) Inventors: Yaniv Zigel, Omer (IL); Moshe Wasserblat, Modiin (IL)

(73) Assignee: Nice Systems Ltd., Raanana (IL)

(*) Notice: Subject to any disclaimer, the term of this patent is extended or adjusted under 35 U.S.C. 154(b) by 1021 days.

(21) Appl. No.: 11/550,951

(22) Filed: Oct. 19, 2006

(65) Prior Publication Data

US 2008/0195387 A1    Aug. 14, 2008

(51) Int. Cl.
*G10L 17/00*    (2006.01)

(52) U.S. Cl. .................................... 704/246
(58) Field of Classification Search ................. 704/246
See application file for complete search history.

(56) References Cited

U.S. PATENT DOCUMENTS

| | | | |
|---|---|---|---|
| 4,145,715 A | 3/1979 | Clever | |
| 4,527,151 A | 7/1985 | Byrne | |
| 5,051,827 A | 9/1991 | Fairhurst | |
| 5,091,780 A | 2/1992 | Pomerleau | |
| 5,303,045 A | 4/1994 | Richards et al. | |
| 5,307,170 A | 4/1994 | Itsumi et al. | |
| 5,353,618 A | 10/1994 | Crick | |
| 5,404,170 A | 4/1995 | Keating | |
| 5,491,511 A | 2/1996 | Odle | |
| 5,519,446 A | 5/1996 | Lee | |
| 5,734,441 A | 3/1998 | Kondo et al. | |
| 5,742,349 A | 4/1998 | Choi et al. | |
| 5,751,346 A | 5/1998 | Dozier et al. | |
| 5,790,096 A | 8/1998 | Hill, Jr. | |
| 5,796,439 A | 8/1998 | Hewett et al. | |
| 5,839,103 A * | 11/1998 | Mammone et al. | 704/232 |
| 5,893,059 A * | 4/1999 | Raman | 704/256.2 |
| 5,895,453 A | 4/1999 | Cook et al. | |
| 5,920,338 A | 7/1999 | Katz | |
| 6,014,624 A * | 1/2000 | Raman | 704/243 |
| 6,014,647 A | 1/2000 | Nizzar et al. | |
| 6,028,626 A | 2/2000 | Aviv et al. | |

(Continued)

FOREIGN PATENT DOCUMENTS

DE    10358333    7/2005

(Continued)

OTHER PUBLICATIONS

NiceVision—Secure your Vision, a prospect by NICE Systems, Ltd.

(Continued)

*Primary Examiner*—Susan McFadden
(74) *Attorney, Agent, or Firm*—Ohlandt, Greeley, Ruggiero & Perle, L.L.P.

(57) ABSTRACT

A method and apparatus for determining whether a speaker uttering an utterance belongs to a predetermined set comprising known speakers, wherein a training utterance is available for each known speaker. The method and apparatus test whether features extracted from the tested utterance provide a score exceeding a threshold when matched against one or more of models constructed upon voice samples of each known speaker. The method and system further provide optional enhancements such as determining, using, and updating model normalization parameters, a fast scoring algorithm, summed calls handling, or quality evaluation for the tested utterance.

39 Claims, 6 Drawing Sheets

U.S. PATENT DOCUMENTS

| | | | |
|---|---|---|---|
| 6,031,573 | A | 2/2000 | MacCormack et al. |
| 6,037,991 | A | 3/2000 | Thro et al. |
| 6,070,142 | A | 5/2000 | McDonough et al. |
| 6,081,606 | A | 6/2000 | Hansen et al. |
| 6,092,197 | A | 7/2000 | Coueignoux |
| 6,094,227 | A | 7/2000 | Guimier |
| 6,111,610 | A | 8/2000 | Faroudja |
| 6,134,530 | A | 10/2000 | Bunting et al. |
| 6,138,139 | A | 10/2000 | Beck et al. |
| 6,167,395 | A | 12/2000 | Beck et al. |
| 6,170,011 | B1 | 1/2001 | Beck et al. |
| 6,212,178 | B1 | 4/2001 | Beck |
| 6,230,197 | B1 | 5/2001 | Beck et al. |
| 6,295,367 | B1 | 9/2001 | Crabtree et al. |
| 6,327,343 | B1 | 12/2001 | Epstein et al. |
| 6,330,025 | B1 | 12/2001 | Arazi et al. |
| 6,345,305 | B1 | 2/2002 | Beck et al. |
| 6,427,137 | B2 | 7/2002 | Petrushin |
| 6,535,850 | B1 * | 3/2003 | Bayya ........................ 704/239 |
| 6,549,613 | B1 | 4/2003 | Dikmen |
| 6,556,969 | B1 * | 4/2003 | Assaleh et al. ........... 704/256.5 |
| 6,570,608 | B1 | 5/2003 | Tserng |
| 6,604,108 | B1 | 8/2003 | Nitahara |
| 6,628,835 | B1 | 9/2003 | Brill et al. |
| 6,704,409 | B1 | 3/2004 | Dilip et al. |
| 6,760,701 | B2 * | 7/2004 | Sharma et al. .............. 704/249 |
| 7,076,427 | B2 | 7/2006 | Scarano et al. |
| 7,103,806 | B1 | 9/2006 | Horvitz |
| 7,283,962 | B2 * | 10/2007 | Meyerhoff et al. .......... 704/270 |
| 7,386,105 | B2 * | 6/2008 | Wasserblat et al. ..... 379/114.14 |
| 7,577,246 | B2 * | 8/2009 | Idan et al. .............. 379/265.01 |
| 2001/0052081 | A1 | 12/2001 | McKibben et al. |
| 2002/0005898 | A1 | 1/2002 | Kawada et al. |
| 2002/0010705 | A1 | 1/2002 | Park et al. |
| 2002/0059283 | A1 | 5/2002 | Shapiro et al. |
| 2002/0087385 | A1 | 7/2002 | Vincent |
| 2003/0033145 | A1 | 2/2003 | Petrushin |
| 2003/0059016 | A1 | 3/2003 | Lieberman et al. |
| 2003/0163360 | A1 | 8/2003 | Galvin |
| 2004/0098295 | A1 | 5/2004 | Sarlay et al. |
| 2004/0141508 | A1 | 7/2004 | Schoeneberger et al. |
| 2004/0161133 | A1 | 8/2004 | Elazar et al. |
| 2004/0249650 | A1 | 12/2004 | Freedman et al. |
| 2006/0093135 | A1 | 5/2006 | Fiatal et al. |
| 2007/0136059 | A1 * | 6/2007 | Gadbois ..................... 704/246 |

FOREIGN PATENT DOCUMENTS

| | | |
|---|---|---|
| EP | 1 484 892 | 12/2004 |
| WO | WO 95 29470 A | 11/1995 |
| WO | WO 98 01838 A | 1/1998 |
| WO | WO 00/73996 | 12/2000 |
| WO | WO 02/37856 | 5/2002 |
| WO | WO 03 013113 A2 | 2/2003 |
| WO | WO 03 067360 A2 | 8/2003 |
| WO | WO 03 067884 A1 | 8/2003 |
| WO | WO 2004 091250 | 10/2004 |

OTHER PUBLICATIONS

NICE Systems announces New Aviation Security Initiative, reprinted from Security Technology & Design.
(Hebrew) "the Camera That Never Sleeps" from Yediot Aharonot.
Freedman, I. Closing the Contact Center Quality Loop with Customer Experience Management, Customer Interaction Solutions, vol. 19, No. 9, Mar. 2001.
PR Newswire, NICE Redefines Customer Interactions with Launch of Customer Experience Management, Jun. 13, 2000.
PR Newswire, Recognition Systems and Hyperion to Provide Closed Loop CRM Analytic Applications, Nov. 17, 1999.
Financial companies want to turn regulatory burden into competitive advantage, Feb. 24, 2003, printed from InformationWeek, http://www.informationweek.com/story/IWK20030223S0002.
SEDOR—Internet pages form http://www.dallmeier-electronic.com.
(Hebrew) print from Haaretz, "The Computer at the Other End of the Line", Feb. 17, 2002.
Article Sertainty—Automated Quality Monitoring—SER Solutions, Inc.—21680 Ridgetop Circle Dulles, VA—WWW.ser.com.
Article Sertainty—Agent Performance Optimization—2005 SE Solutions, Inc.
Lawrence P. Mark SER—White Paper—Sertainty Quality Assurance—2003-2005 SER Solutions Inc.
Robust Text Independent Speaker Identification Using Gaussian Mixture Speaker Models.
Douglas A. Reynolds Robust Text Independent Speaker Identification Using Gaussian Mixture Speaker Models—IEEE Transactions on Speech and Audio Processing, vol. 3, No. 1, Jan. 1995.
Chaudhari, Navratil, Ramaswamy, and Maes Very Large Population Text-Independent Speaker Identification Using Transformation Enhanced Multi-Grained Models—Upendra V. Chaudhari, Jiri Navratil, Ganesh N. Ramaswamy, and Stephane H. Maes—IBM T.j. Watson Research Centre—Oct. 2000.
Douglas A. Reynolds, Thomas F. Quatieri, Robert B. Dunn Speaker Verification Using Adapted Gaussian Mixture Models—Oct. 1, 2000.
Yaniv Zigel and Moshe Wasserblat—How to deal with multiple-targets in speaker identification systems?
A tutorial on text-independent speaker verification—Frederic Bimbot, Jean Bonastre, Corinn Fredouille, Guillaume Gravier, Ivan Chagnolleau, Sylvian Meigner, Teva Merlin, Javier Ortega Garcia, Dijana Deacretaz, Douglas Reynolds—Aug. 8, 2003.
Towards an Automatic Classification Of Emotions In Speech—N. Amir. S. Ron.
Frederic Bimbot et al—A Tutorial on Text-Independent Speaker Verification EURASIP Journal on Applied Signal Processing 2004:4, 430-451, 2003.
Yeshwant K. Muthusamy et at—Reviewing Automatic Language Identification IEEE Signal Processing Magazine 33-41, 1994.
Marc A. Zissman—Comparison of Four Approaches to Automatic Language Identification of Telephone Speech IEEE Transactions on Speech and Audio Processing, vol. 4, 31-44, 1996.
NiceVision—Secure your Vision, a prospect by NICE Systems, Ltd, Jan. 20, 2004.
NICE Systems announces New Aviation Security Initiative, reprinted from Security Technology & Design, Oct. 16, 2001.
(Hebrew) "the Camera That Never Sleeps" from Yediot Aharonot, Nov. 10, 2004.
Freedman, I. Closing the Contact Center Quality Loop with Customer Experience Management, Customer Interaction Solutions, vol. 19, No. 9, Mar. 2001.
PR Newswire, NICE Redefines Customer Interactions with Launch of Customer Experience Management, Jun. 13, 2000.
PR Newswire, Recognition Systems and Hyperion to Provide Closed Loop CRM Analytic Applications, Nov. 17, 1999.
Financial companies want to turn regulatory burden into competitive advantage, Feb. 24, 2003, printed from InformationWeek, http://www.informationweek.com/story/IWK20030223S0002.
SEDOR—Internet pages form http://www.dallmeier-electronic.com, May 1, 2003.
(Hebrew) print from Haaretz, "The Computer at the Other End of the Line", Feb. 17, 2002.
Article Sertainty—Automated Quality Monitoring—SER Solutions, Inc.—21680 Ridgetop Circle Dulles, VA—WWW.ser.com, Apr. 19, 2004.

Article Sertainty—Agent Performance Optimization—2005 SE Solutions, Inc, Feb. 15, 2006.

Lawrence P. Mark SER—White Paper—Sertainty Quality Assurance—2003-2005 SER Solutions Inc., Dec. 8, 2004.

Reynolds Robust Text Independent Speaker Identification Using Gaussian Mixture Speaker Models, Jan. 1, 1995.

Douglas A. Reynolds Robust Text Independent Speaker Identification Using Gaussian Mixture Speaker Models—IEEE Transactions on Speech and Audio Processing, vol. 3, No. 1, Jan. 1995.

Chaudhari, Navratil, Ramaswamy, and Maes Very Large Population Text-Independent Speaker Identification Using Transformation Enhanced Multi-Grained Models—Upendra V. Chaudhari, Jiri Navratil, Ganesh N. Ramaswamy, and Stephane H. Maes—IBM T.j. Watson Research Centre—Oct. 2000.

Douglas A. Reynolds, Thomas F. Quatieri, Robert B. Dunn Speaker Verification Using Adapted Gaussian Mixture Models—Oct. 1, 2000.

Yaniv Zigel and Moshe Wasserblat—How to deal with multiple-targets in speaker identification systems, Jun. 28, 2006.

A tutorial on text-independent speaker verification—Frederic Bimbot, Jean Bonastre, Corinn Fredouille, Guillaume Gravier, Ivan Chagnolleau, Sylvian Meigner, Teva Merlin, Javier Ortega Garcia, Dijana Deacretaz, Douglas Reynolds—Aug. 8, 2003.

* cited by examiner

METHOD AND APPARATUS FOR LARGE POPULATION SPEAKER IDENTIFICATION IN TELEPHONE INTERACTIONS

RELATED APPLICATIONS

The disclosed invention relates to U.S. patent application Ser. No. 10/567,810 titled METHOD AND APPARATUS FOR SEGMENTATION OF AUDIO INTERACTIONS filed Feb. 9, 2006, to U.S. patent application Ser. No. 11/139,812 titled METHOD AND APPARATUS FOR FRAUD DETECTION filed May 27, 2005, and to U.S. patent application Ser. No. 10/996,811 titled METHOD AND APPARATUS FOR SPEAKER SPOTTING filed Nov. 23, 2004, the full contents of which are incorporated herein by reference.

BACKGROUND OF THE INVENTION

1. Field of the Invention

The present invention relates to speaker identification in general, and to determining whether a specific speaker belongs to a group of known speakers in particular.

2. Discussion of the Related Art

Speaker identification generally relates to determining whether a specific speaker, whose voice is available, belongs to a known group of speakers referred to as the target-set, whose voice prints are available, too. Environments in which such determination is required include but are not limited to call centers, trade floors, or law enforcement organizations, which capture and/or record voices involved in a conversation, whether the conversations were made by the people calling a call center, or have been lawfully intercepted by a law enforcement agency. Such environments often retain a collection of target speaker voices, i.e. voices of speakers for whom it is required to know when they are calling or calling or otherwise interacting with the organization. Thus, it may be required that an alert is generated whenever activity involving a member of the target set, i.e. a target, is detected. Exemplary target sets include impostors known to a credit card company, criminals or terrorists known to a law enforcement organization, or the like. Speaker identification is often confused with speaker verification, in which a system verifies whether a caller claiming to be a person known to the system, is indeed that person. For that end, the system ought to have a characteristic, such as a voice print of the known person, to which the voice print of the calling person is compared. Speaker identification, optionally when combined with speaker verification, can also be used for applications such as fraud detection. In fraud actions, a speaker is attempting an identity theft, i.e. pretends to be another, usually innocent person. Speaker identification can help in verifying or invalidating the identity of the person, and in assessing whether the speaker belongs to a group of known fraudsters.

Within speaker identification systems, there are two main branches, being closed set identification and open set identification. In closed-set identification, it is known that the speaker is indeed one of the target-set speakers, and the problem is to identify him or her. In open-set identification, the speaker may be one of the target set speakers or not. In such case, it is required to determine whether the speaker belongs to the target group or not, and in the first case, who is target within the group that matches the speaker's voice. The decision is usually done in two stages: first, determining the speaker in the target-set whose voice has the highest score of matching the specific speaker; and deciding whether the highest score at hand is beyond a predetermined threshold so that it can be declared that the speaker at hand indeed belongs to the target group.

Open set identification is naturally a more complex problem, and is therefore addressed less often. Three types of errors exist in open-set identification: 1) False Acceptance (FA) error—occurs when the maximum score is above a threshold, when the speaker is a non-target speaker, i.e. does not belong to the target set. 2) False reject (FR or miss) error—occurs for a target speaker when the score is below the threshold. 3) Confusion error—occurs for a target test when the highest score is indeed above the threshold, but the wrong target model is the one that yielded the highest score. The confusion error is eliminated when it is only required to know whether the tested speaker belongs to the target-set or not, and the exact identity of the speaker is not important. As the predetermined threshold is for declaring a voice to belong to a member of the target set is raised, the probability of false accept errors will drop, while the probability of false reject errors will increase, and vice versa. Choosing a threshold depends, among additional factors, on the type of chances the organization is willing to take. For example, a law enforcement organization might be ready to invest the extra work resulting from higher rates of false acceptance, while financial organizations are more likely to weight the monetary loss caused by a cheating impostor against the extra effort required to test significantly more calls. Thus, under similar conditions, a law enforcement organization is likely to use a higher threshold, and allow the system to declare more speakers as belonging to the target set and generate alerts for more speakers, than a monetary organization would tolerate.

Known problems in the art related to open-set speaker identification include: selecting the relevant parameters for creating a voice print, both of the speakers in the target set and of the tested voice; weighting or otherwise combining the matching of the features; choosing a threshold beyond which a person whose voice is tested is determined to belong to the target set; constructing one or more background models, which are generally used as a normalization factor or reference to determine the matching between a tested voice and a target voice. However, real-life speaker identification imposes additional difficulties to those handled in an academic or other "ideal" environment. Among these, the following problems are known to cause reduced performance: 1. Often the two or more sides participating in a conversation are captured as a single stream, such that the voices to be analyzed are not separated from other voices. The combined conversation reduces the ability to achieve a separate recording of the desired voice for testing. Moreover, even of the separation between the sides participating in the conversation was satisfactory, often the "other" side, such as the agent in a call center conversation, who is generally of no interest, was the one to yield a higher score and be detected as a target, thus causing extra useless work for an evaluator. 2. Since the target set might comprise hundreds, thousands or more voices, checking each single tested voice against all of them might take a long time, and produce results, if at all, in unacceptable time delay. 3. The quality of the voice might be sub-optimal, which may significantly harm the reliability of the results. 4. The voices in the target sets might have different behavior, i.e. the comparison between a tested voice and two (or more) voice prints belonging to two (or more) targets may produce unequally significant results. However, the comparison is made using a uniform threshold, which may lead to skew results. 5. In open-set speaker identification systems, a known phenomenon is that the false accept error rate increases substantially when the size of the target set increases.

There is therefore a need for a method and apparatus that will provide results improved both in quality and in speed for open-set speaker identification. The method and apparatus should provide improved solution for known problems related to open-set identification, as well as to problems such as combined conversations, agent separation, poor quality conversations, and variations of behavior within target set members.

SUMMARY OF THE PRESENT INVENTION

It is an object of the present invention to provide a novel method and apparatus for performing open set speaker identification, i.e. providing a score that a speaker whose voice print is given belongs to a group of targets whose voices are available.

There is thus provided in accordance with an exemplary embodiment of the invention a method for determining whether a speaker uttering a tested utterance belongs to a predetermined set comprising one or more known speakers, wherein one or more training utterances are available for each of the known speakers, the method comprising the steps of: extracting one or more first features of each training utterance; estimating one or more models from the first features; extracting one or more second features from one or more frames of the tested utterance; scoring the second features against one or more of the models, to obtain one or more intermediate scores; determining one or more model scores using the intermediate scores; selecting one or more maximal scores from the model scores; and the speaker is determined to belong to the predetermined set, if one or more maximal scores exceeds a threshold. Optionally, the threshold is predetermined or post determined. The method optionally comprises a step of generating an alert when the speaker is determined to belong to the predetermined set. Optionally, there are two or more voices belonging to two or more speakers in the tested utterance or the training utterance, and the method comprises a step of summed call handling for separating the tested utterance or the training utterance to at least two sides. Optionally, the method comprises a step of detecting an agent side within the at least two sides. The method can further comprise a step of building one or more background models. Optionally, the method comprised the steps of: scoring the second features against the background models to obtain one or more background scores; and integrating the model scores with the background scores to enhance the model score. Optionally, the method comprises a step of scaling the maximal score to be in a predetermined range. Optionally, the method comprises a step of gender detection for the speaker or for the known speakers. The method can further comprise the steps of: extracting one or more third features from a part of the tested utterance; scoring the third features against each of the models to obtain one or more temporary model scores; selecting one or more temporary maximal scores from the temporary model scores, the temporary maximal scores associated with one or more models to be checked; scoring the second feature against the models to be checked, to obtain the model scores. Optionally, the method comprises the steps of determining one or more normalization parameters associated with each of the models; and normalizing the model scores using the normalization parameters. The method can further comprise the step of updating the normalization parameters using the model scores. Within the method, the normalization parameters are optionally determined from to or more voice utterances uttered by none of the known speakers. The normalization parameters optionally comprise the mean or the standard deviation of two or more scores associated with the model. Within the method, the normalization parameters are optionally determined from two or more model scores exceeding a second threshold, or from two or more model scores having a score belonging to a predetermined top percentage of a multiplicity of model scores. The method optionally comprises a step of evaluating one or more scalar measures related to the tested utterance. Optionally, the model score is determined based on one or more intermediate scores having a value higher than one or more second intermediate scores. The method optionally comprises a preprocessing step for segmenting the tested utterance or the training utterance and discarding one or more frames of the tested utterance or the training utterance. The method is optionally used within a fraud detection method. The method can further comprise a speaker verification step, for issuing a probability that the speaker is who he is claiming to be; and a total fraud risk determination step for determining a total fraud risk based on the determination that the speaker belongs to the predetermined set and on the probability that the speaker is who he is claiming to be.

Another aspect of the disclosed invention relates to an apparatus for determining whether a speaker uttering a tested utterance belongs to a predetermined set comprising one or more known speakers, wherein one or more training utterances are available for each of the known speakers, the apparatus comprising: a feature extraction component for extracting one or more first features of the tested utterance or of each of the training utterances; a frame scoring component for scoring one or more features against one or more models, to obtain one or more intermediate scores; a total model scoring component for determining one or more model scores using the intermediate scores; and a maximal score determination component for selecting a maximal score from the at least one model score. The apparatus optionally comprises a model estimation component for estimating the models. The apparatus can further comprise a summed call handling component for separating the tested utterance or the training utterance to two or more sides. Optionally, the apparatus comprises an agent detection component for detecting an agent side within the two or more sides. Optionally, the apparatus comprises a score scaling component for scaling the maximal score to be in a predetermined range. The apparatus can further comprise a gender detection component for determining whether a speaker in the tested utterance or in the training utterances is a male or a female. Optionally, the apparatus comprises a model normalization parameter initialization component, for evaluating one or more parameters associated with a model. The apparatus can further comprise a model normalization parameter update component, for updating the one or more parameters associated with a model. Optionally, the apparatus further comprises a score adaptation component for adapting one or more model scores using one or more model normalization parameters. The apparatus can comprise a decision component for determining according to the maximal score whether the speaker uttering the tested utterance belongs to the predetermined set. Optionally, the apparatus further comprises a quality evaluation component for determining one or more quality measures associated with one or more parts of the tested utterance. The apparatus optionally comprises an alert generation generation component for issuing an alert when the speaker uttering the tested utterance is determined to belong to the predetermined set. The apparatus can further comprise a capturing or logging component for capturing or logging the tested utterance. Optionally, the apparatus further comprises a fraud detection component for determining a probability that the speaker is a fraudster.

Yet another aspect of the disclosed invention relates to a computer readable storage medium containing a set of instructions for a general purpose computer, the set of instructions comprising extracting one or more first features of each of one or more training utterances, each of the training utterances uttered by a person belonging to a target set; estimating one or more models from the first features, the models associated with persons belonging to the target set; extracting one or more second features from one or more frames of a tested utterance; scoring the second features against the models to obtain one or more intermediate scores; determining a model score using the intermediate scores; selecting a maximal score from the model scores; and determining whether a speaker of the tested utterance belongs to the target set.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which.

DETAILED DESCRIPTION OF THE PREFERRED EMBODIMENT

Figure 1:
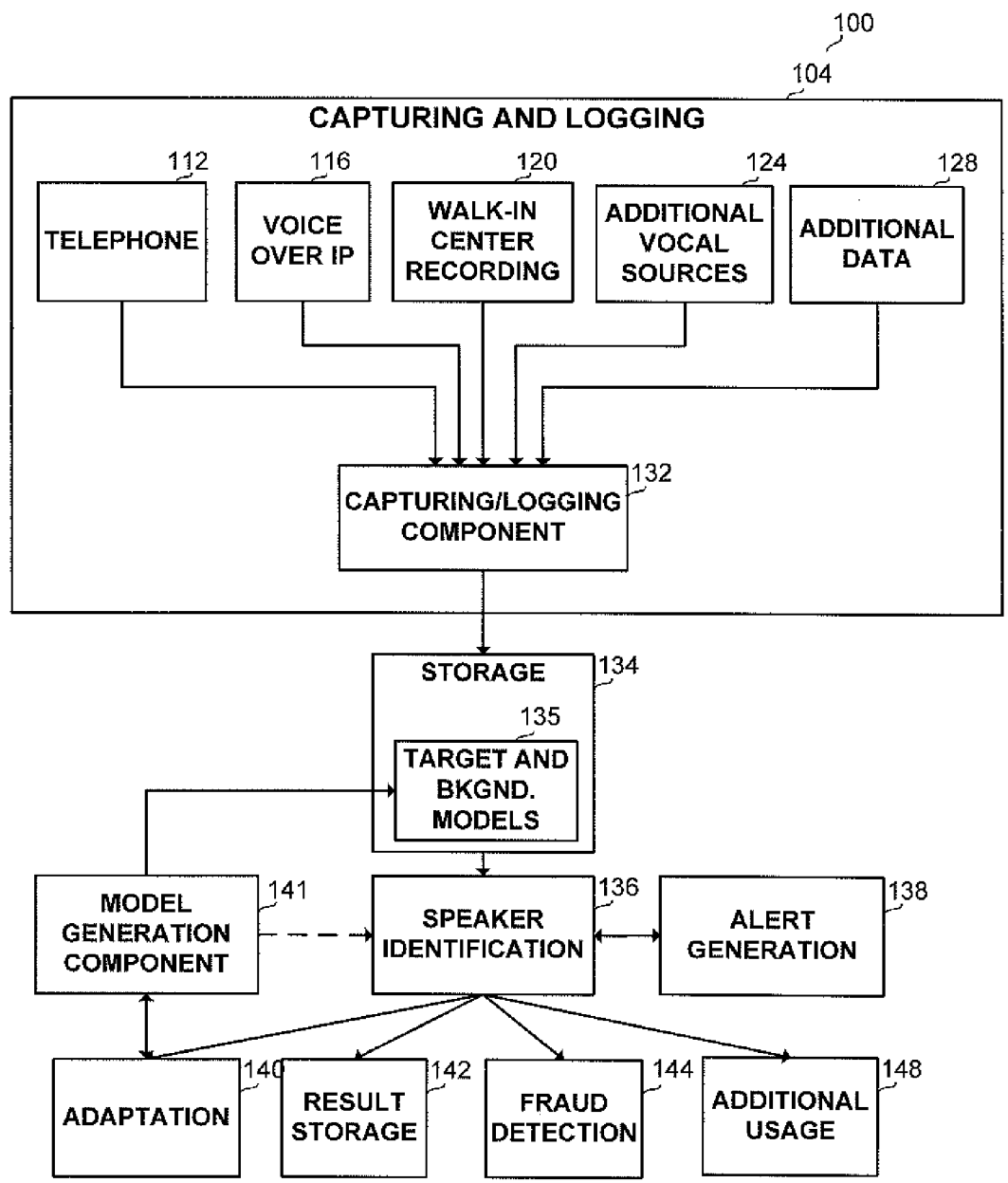
FIG. 1 is a block diagram of the main components in a typical environment in which the disclosed invention is used.

The present invention overcomes the disadvantages of the prior art by providing a novel solution which enhances and adds to the capabilities of currently available methods and apparatuses for open-set speaker identification. The method involves exercising the steps known in the art for speaker identification, although the steps may be implemented in an enhanced manner, and additional steps. The steps known in the art include preliminary steps and on-going steps. The preliminary steps comprise building a model for each voice in the target set and building one or more background models. The ongoing steps comprise: extracting features from the tested voice; matching the tested voice against all target models; choosing the target model for which the highest match was handled; and determining whether said highest match exceeds a predetermined threshold, so that the tested voice is associated the with the target set. The additional steps, aimed at enhancing the process and the results include steps preceding the matching, or steps following the matching. The preceding steps are one or any combination of the following steps: A). separating summed calls (i.e. calls in which the voices of the two speakers are captured in one stream) in order to provide the matching step with voice samples of one speaker, and not a combination of two or more speakers, thus avoiding distorted results. B). Agent detection: once the two sides of a conversation are separated, identifying the agent side of a conversation, in case the organization is a call center, a trading floor or the like, will eliminate errors resulting from identifying the agent rather than the other person as belonging to the target set. C). Providing a semi-automatic tool for extracting the voices of the targets from summed calls, in order to provide enhanced models for the targets to compare to. D). A fast scoring step, for dealing with the ever growing size of the target sets and providing faster initial results and enable shorter response time in case the tested voice indeed belongs to a target. E). Gender detection for the tested voice and the target sets, in order to enhance results and reduce response time by comparing the tested voice only to part of the target set. F). Extracting from the tested voice stream only those parts of having the highest voice quality. G). Discarding altogether tested voice streams having overall low quality, or at least providing indication for low quality voice streams. H). Providing normalization parameters for the models of the targets in order to normalize the results of comparing a tested voice to multiple target models. The steps following the matching include: I) Normalizing the results of comparing a tested voice to multiple target models. J). Adapting the normalization parameters for the models of the targets, using the matching results. K). Scaling the scores of matching a tested voice against the target sets, in order to provide the desired distribution, and meaningful indications for a user. These steps will be detailed in association with the following figures.

Referring now to FIG. 1, which presents a block diagram of the main components in a typical environment in which the disclosed invention is used. The environment, generally referenced as 100, is an interaction-rich organization, typically a call center, a bank, a trading floor, another financial institute, a public safety contact center, an interception center of a law enforcement organization, or the like. Voices of customers, users or other contacts are captured, thus generating input information of various types. The information types include vocal interactions, non-vocal interactions and additional data. The capturing of voice interactions can employ many forms and technologies, including trunk side, extension side, summed audio, separate audio, various encoding and decoding protocols such as G729, G726, G723.1, and the like. The vocal interactions usually include telephone 112, which is currently the main channel for communicating with users in many organizations. The voice typically passes through a PABX (not shown), which in addition to the voice of the two or more sides participating in the interaction collects additional information discussed below. A typical environment can further comprise voice over IP channels 116, which possibly pass through a voice over IP server (not shown). The interactions can further include face-to-face interactions, such as those recorded in a walk-in-center 120, and additional sources of vocal data 124, such as microphone, intercom, the audio of video capturing, vocal input by external systems or any other source. In addition, the environment comprises additional non-vocal data of various types 128. For example, Computer Telephony Integration (CTI) used in capturing the telephone calls, can track and provide data such as number and length of hold periods, transfer events, number called, number called from, DNIS, VDN, ANI, or the like. Additional data can arrive from external sources such as billing, CRM, or screen events, including text entered by a call representative, documents and the like. The data can include links to additional interactions in which one of the speakers in the current interaction participated. Another type of data includes data extracted from vocal interactions, such as spotted words, emotion level, speech-to-text or the like. Data from all the above-mentioned sources and others is captured and preferably logged by capturing/logging unit 132. The captured data is stored in storage 134, comprising one or more magnetic tape, a magnetic disc, an optical disc, a laser disc, a mass-storage device, or the like. The storage can be common or separate for different types of captured interactions and different types of additional data. Alternatively, the storage can be remote from the site of capturing and can serve one or more sites of a multi-site organization. Storage 134 further stores voice models of the target set members and back ground models. The models are prepared by model generation component 141 detailed below, which can be activated also by speaker identification component 136. Capturing/logging unit 132 comprises a computing platform running one or more computer applications as is detailed below. From capturing/logging unit 132, the vocal data and preferably the additional relevant data is transferred to speaker identification component 136 which executes the actual speaker identification method. If a speaker is identified as belonging to the target set, i.e. the score or probability for such event exceeds a predetermined threshold, a command is sent to alert generation component 138. The threshold can alternatively be post-determined as explained in association with step 382 of FIG. 3 below. The alert can take any form, such as sending an e-mail, fax, SMS, telephone message or others to a person in charge, updating a database or other actions. The person in charge preferably receives also the speaker's voice, with or without with the entire conversation and the identity of the target set member suspected to be the speaker. The identification results can be used internally within speaker identification component 136 for adapting the target set models 135. The results are optionally used also in model adaptation component 140, used for updating the model generated by model generation component 141. Alternatively or additionally, the identification information is transferred for storage purposes to result storage 142. In a preferred embodiment, the speaker identification results are optionally transferred also to fraud detection component or system 144, which issues a probability that the calling person is a fraudster. A preferred embodiment of a fraud detection system is provided in U.S. patent application Ser. No. 11/139,812 titled METHOD AND APPARATUS FOR FRAUD DETECTION, filed May 27, 2005. The relation between the speaker identification results and the fraud system is further detailed in association with FIG. 6 below. In addition, the speaker identification information and intermediate products of the process can be transferred to any other purpose or component 148, such as generating reports, supplying information about segmentation for further analysis or playback applications, collecting gender information for statistics purposes, or the like. All components of the system, including capturing/logging components 132 and speaker identification component 136, preferably comprise one or more computing platforms, such as a personal computer, a mainframe computer, or any other type of computing platform that is provisioned with a memory device (not shown), a CPU or microprocessor device, and several I/O ports (not shown). Alternatively, each component can be a DSP chip, an ASIC device storing the commands and data necessary to execute the methods of the present invention, or the like. Each component can further include a storage device (not shown), storing the relevant applications and data required for processing. Each application running on each computing platform, such as the capturing applications or the segmentation application is a set of logically inter-related computer programs, modules, or other units and associated data structures that interact to perform one or more specific tasks. All applications can be co-located and run on the same one or more computing platform, or on different platforms. In yet another alternative, the information sources and capturing platforms can be located on each site of a multi-site organization, and one or more application components can be remotely located, identify speakers in interactions captured at one or more sites and store the identification results in a local, central, distributed or any other storage.

Figure 2:
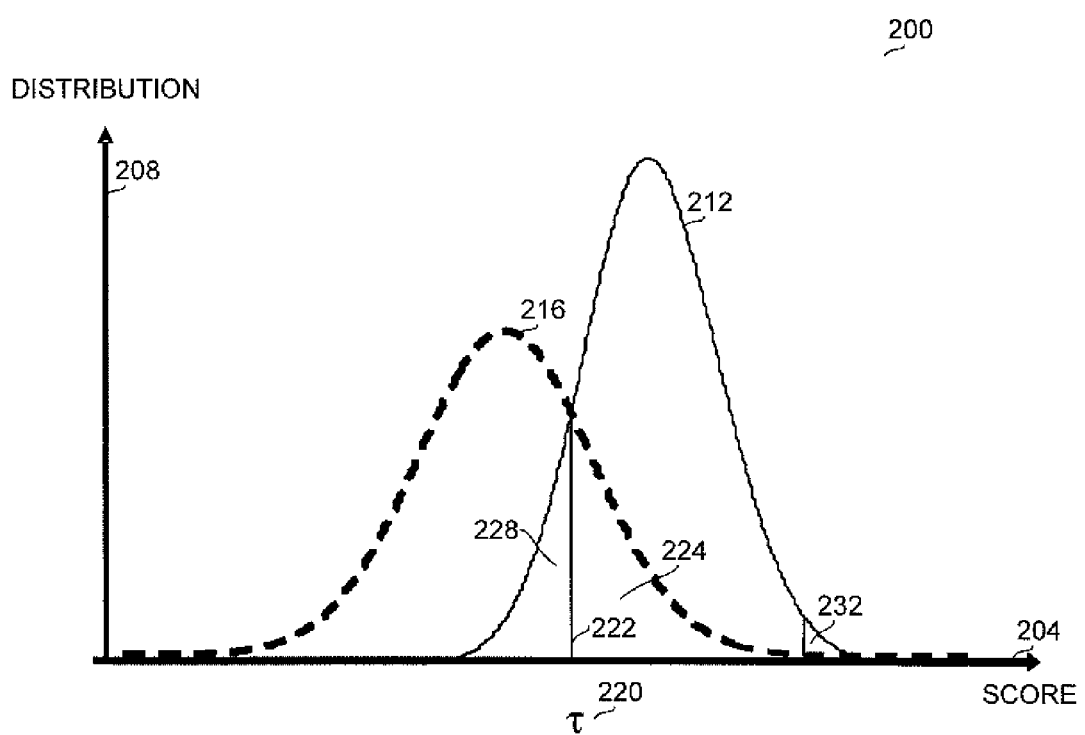
FIG. 2 is a graph of the distribution of scores, for targets and non-targets.

Referring now to FIG. 2, showing a graph of the distribution of scores, for targets and non-targets. The graph, generally referenced 200, comprises a horizontal axis 204 denoting the score, i.e. the probability that a speaker's voice is identified as belonging to the target set, and a vertical axis 208, denoting the distribution of the scores. Graph 200 comprises plot 212 denoting the distribution of score for speakers known to be targets, and plot 216 denoting the distribution of score for speakers known to be non-targets. The threshold □ is optionally predetermined to have the value denoted as 220, and line 222 separates the common area under plots 212 and 216 into area 224, and area 228. Area 224 denotes the false accept error area (i.e. those speakers whose score exceeds the threshold so they are reported as being a target although they are known not to be targets. Area 228 denoted the false reject area, i.e. those speakers whose score was below the threshold so they were not reported as targets, although they are known to be such. The value of □ determines the relation between area 224 and area 228. The higher □ is, the smaller the false accept area and larger false reject area (which might be more suitable to financial organizations) and vice versa.

Figure 3:
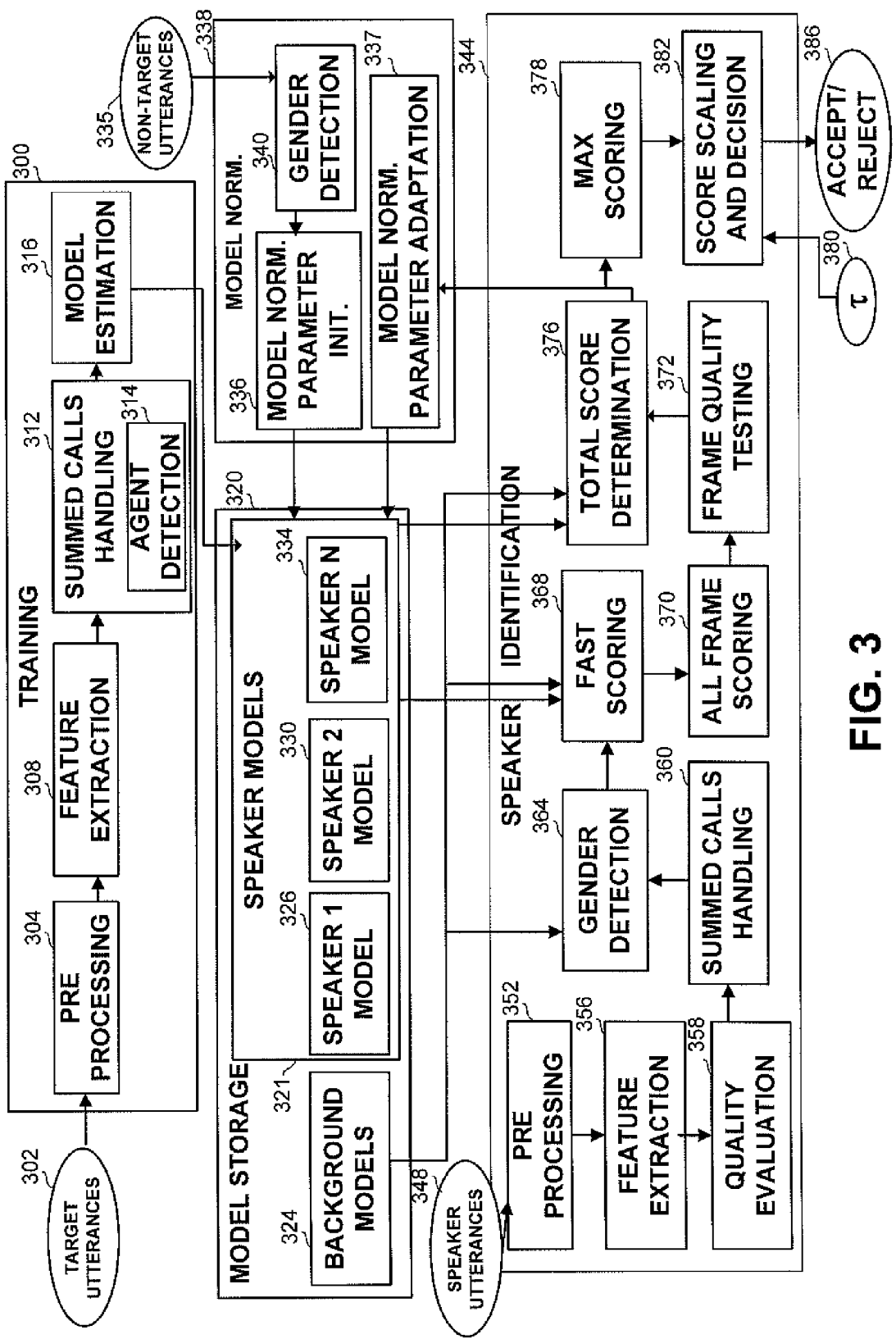
FIG. 3 is a flowchart of the main steps performed in association with the speaker identification process, in accordance with a preferred embodiment of the disclosed invention.

Referring now to FIG. 3, showing a flowchart of the main steps performed in association with the speaker identification process, performed by model generation component 141, speaker identification component 136, and model adaptation component 140 while using storage 135 of FIG. 1. The method generally comprises a training step 300 and speaker identification step 344. Training step 300 is useful in constructing reference models relating to a specific speaker associated with the target set or to a group of speakers, and speaker identification step 344 determines whether a speaker whose voice is presented to the system belongs to the target set. The models constructed and stored in model storage 320 during training phase 300 comprise speaker models 321, containing models for all target set speakers, such as speaker 1 model 326, speaker 2 model 330, until speaker N model 334 wherein N is the number of speakers in the target set. The reference models comprise also one or more background models such as background models 324. A background model comprises characteristics of voices typical to a specific environment or speakers. For example, a background model can characterize all speakers, male speakers, female speakers, different acoustic environments, different channels, or other subgroups of voices of callers calling a call center, and captured. The model comprises characteristics of the call center and of the recording equipment. Optionally, after a voice is compared to a model of a specific speaker from the target set during the identification process, the match result is normalized using a match between the speaker and a background model, in order to enhance the score. The model generation process comprises the following steps: a target utterance 302 is fed into preprocessing step 304, in which the target utterance available as a voice signal is first segmented into speech frames of about 20-ms window progressing at an about 10-ms frame rate. Then, frames that include silence and frames that include significant levels of noise are discarded leaving only speech frames. The exclusion is optionally performed by a self-normalizing, energy-based detector. Then at step 308 voice features are extracted from the audio, thus generating a multiplicity of feature vectors, one vector for each frame. The voice features are preferably MFCC (Mel Frequency Cepstral Coefficients) feature vectors are extracted from the speech frames. The MFCC is the discrete cosine transform of the log-spectral energies of the speech segment. The spectral energies are calculated over log-arithmetically spaced filters with increased bandwidths also referred to as mel-filters. All the cepstral coefficients except those having zero value (the DC level of the log-spectral energies) are retained in the processing. Then DMFCC (Delta Cepstral Mel Frequency Cepstral Coefficients) are computed using a first order orthogonal polynomial temporal fit over at least +/−two feature vectors (at least two to the left and at least two to the right over time) from the current vector. The feature vectors are channel normalized to remove linear channel convolution effects. Subsequent to the utilization of Cepstral features, linear convolution effects appear as additive biases, so Cepstral mean subtraction (CMS) is used. Note should be taken that the use of the MFCC features and the associated DMFCC features is exemplar only. In other preferred embodiment of the present invention, other types of spectral energy transform and associated computations could be used. At step 312 summed calls are separated in order to separate a call wherein the two or more sides of a conversation were captured together into separate streams. The speaker separation step is detailed in U.S. patent application Ser. No. 10/567,810 titled METHOD AND APPARATUS FOR SEGMENTATION OF AUDIO INTERACTIONS filed Feb. 9, 2006. Summed calls handling step 312 optionally comprises agent detection step 314, in which after separating the voices, it is determined which side was spoken by the agent (in the case of calling a call center, a trade floor or the like), and which side belongs to the customer. In the case of building a model for a target, since the number of targets is limited, this step can be performed manually by a person listening to the calls. Alternatively, this can be done by searching for compliance words such as "good morning how can I help you" in both streams and determining that the stream in which this phrase or similar ones is spotted with higher degree of certainty is the agent side. In yet another alternative, a user can be supplied with a user interface, in which he clicks with a mouse or otherwise marks points in a conversation in which the agent speaks, which serves also as an improved starting point for the speaker separation. At step 316 a speaker model is estimated from the feature vectors of the relevant feature vectors collected for each speaker of the target set. In a preferred embodiment, the target model comprises an array of parameters that represent the Probability Density Function (PDF) of the specific speaker feature vectors. When using Gaussian Mixture Models (GMM) for modeling the PDF, the parameters are: Gaussians average vectors, co-variance matrices and the weight of each Gaussian. Thus, when using GMM rather than storing the target voice or elements thereof, a target voice model is built based on computational results of extracted feature vectors, which represent only the statistically dominant characteristics of the speaker based on the GMM results. The model is generally a vector of parameters characterizing the speaker. The model construction is further detailed in "Speaker Verification Using Adapted Gaussian Mixture Models" by Reynolds et al. published in Digital Signal Processing vol. 10 Nos. 1-3, January/April/July 2000 pp. 19-41, incorporated herein by reference. Once each model is generated, it is stored in speaker model storage 321 within model storage 320. Optionally, any one or more parameters associated with each model such as but not limited to the gender of the target, normalization parameters, channel information, telephone device information, or the like are also stored with the model. Once a model is constructed, optionally a model normalization parameter initialization step 336 is performed for providing initial parameters for normalizing the score of matching a speaker characteristics vector with a model. Model normalization parameters initialization step 336 receives non-target utterances 335, and optionally uses a gender detection step 340. Model normalization parameter initialization step 336 and model normalization parameter adaptation step 337, referenced together as model normalization steps 338, are further detailed below. Once the models are ready, speakers voice can be tested whether they belong to the target set or not. Once a speaker's utterance 348 is captured available as a voice signal making the speaker's voice available for processing, it can be tested. At step 352, the voice undergoes preprocessing, in an analogous fashion to the preprocessing of a target utterance performed at step 304 detailed above. Feature extraction step 356 and summed calls handling step 360 are also performed in an analogous fashion to feature extraction step 308 and summed calls handling step 312, including an optional step of agent detection. However, unlike the target voices, the agent detection step as performed within summed calls handling step 360 is preferably fully automatic and does not receive indications from a user. Speaker identification step 344 further comprises an optional signal quality evaluation step 358, in order to provide one or more scalar measures of the quality of the tested audio signal. This information may prove important since the performance of audio analysis algorithms is degraded as a result of low quality signals. The robustness of each audio step is affected by one or more aspects of the signals quality. Thus, the quality measures can be used by the audio analysis algorithms employed at the various steps, such that each algorithm will consider the relevant quality measures in the analysis results, hence the algorithms performance will improve. The evaluated measures can include one or more of the following parameters, or additional ones: signal to noise ratio level; segmental signal to noise ratio level; noise level; echo level and delay; source coherency (including for example: the number of speakers in the segment, number of transitions between speakers, non speech acoustic sources like music, etc); estimated MOS (Mean Opinion Score); speech to non-speech ratio; saturation detection; compression type; channel distortion analysis; or weighted quality score, comprising a combination of one or more of the above mentioned parameters). One or more rules can be designed to associate one or more quality measures with further steps. For instance if the speaker separation preformed as part of summed calls handling step 360 is not satisfactory for one or more utterances, then these utterances can be discarded, since the identification results will not be meaningful. Thus, it can be decided whether to perform or not perform the analysis in case of low quality in one or more parameters; the accuracy estimation of the algorithm results might change according to the values of the quality parameters; a decision to disqualify a specific result, re-analyze the signal or enhance the signal can be taken . . . Gender detection can be performed for example, by pre-training two background models: one from male speech utterances and the second from female speech utterances. When a voice is to be tested, it is matched against these models and two scores are obtained: a male score and a female core. The higher score value indicates the gender of the input voice. Fast scoring step 368 is an optional step, designed to provide estimated partial scoring results, in order to reduce the total time required for speaker identification, and thus possibly enable real-time or near-real-time identification of a speaker and rapid action in the case of positive (or negative, depending on the application) answer. Fast scoring step 368 uses the same mechanisms as total score determination step 376 detailed below. However, fast scoring step 368 first tests a fraction of the input utterance against all models and chooses the models that provide the highest scores, and then tests the full input utterance only against the models that yielded the top scores. In a preferred embodiment of the fast scoring test, only the initial part of the utterance is processed and matched against the models of the target set. As an initial part, any part having any length of the utterance segment can be used. The part can be the beginning or any other part of the utterance, and can range in length between a few tenths of a second and multiple minutes, and typically between 0.5 second and 10 seconds. However, the benefit of implementing fast scoring step 368 is significant when the fraction processes is significantly shorter than the initial segment. Alternatively, the part of the utterance used can be a non-continuous part, but rather a decimation of the utterance, i.e. a collection of samples collected at intervals throughout the utterance. The higher the sampling rate, the higher the quality but the lower the time reduction in the scoring, and vice versa. Once the partial segment is generated, it is then matched against all the target set models. Since the matching involves exercising a loop over the frames of the input signal, when the number of frames is significantly reduced, so does the time required for matching. After matching the partial utterance against all the target set models, only the models whose matching provided the highest scores are selected. For example, a predetermined percentage of the models, such as those having the top 10% of the scores, or a predetermined number of models having the highest scores are selected. Then, at all frame scoring step 370, the frames from the entire input utterance are matched against the target models. If fast scoring step 368 was performed, the frames are matched against the selected models, which are selected to be significantly fewer than the total number of the target set models. Otherwise, the frames from the input utterance are matched against each model in the target set. Scoring a single frame against a model, which is performed both in fast scoring step 368 and in all-frame scoring step 370 is preferably performed by determining a distance between the feature vector extracted from the frame, and the model. The distance function can implement Euclidean distance, Mahalanobis distance, a likelihood function, or any other function.

In a preferred embodiment, the scoring function that matches an utterance against a model, takes into account the distance between the utterance and the model, as well as the distance between the utterance and a background model, in order to normalize each voice against a more general model. A preferred method for determining the score can be generally stated as integrating, using some function $f$ the score of the utterance against a specific model with the score of the utterance against one or more background models:

$s_n(O) = f\{p(O|\lambda_n), \{p(O|\lambda_b)\}_{b \in B}\}$, wherein $s_n(O)$ is the score of feature vector sequence O, arranged as a matrix, a concatenation of vectors or any other arrangement, against the n-th model, $p(O|\lambda_n)$ is a certain likelihood measure or distance between sequence O and the n-th model, and $p(O|\lambda_b)$ is the distance between O and a certain background model b, wherein b belongs to B, being a set of background models. A possible specific formula can be $$s_n(O) = \log\left(\frac{p(O|\lambda_n)}{p(O|\lambda_B)}\right) = \log p(O|\lambda_n) - \log p(O|\lambda_B)$$

wherein p represents a likelihood function. Frame quality testing step 372 is also an optional step. In step 372, problematic speech frames which stem from phonetic utterances of speech events, such as laughter, hesitation, stammering and disfluency, and which may introduce unreliable scoring results, are discarded. Thus, in a first preferred embodiment, only the frames producing the highest scores against each model are taken into account for total score determination step 376, since higher score frames are more likely to characterize the speaker. For example, only the top about 10%-90% of the scores may be considered. In a second preferred embodiment, only the frames comprising meaningful information are considered, and frames which provide no information on the specific speaker are neglected. For example silent frames or frames comprising abrupt noise in the channel are excluded, and frames comprising speaker characteristics are seized. This can be done, for example by determining the average measure of a predetermined feature (e.g. pitch) and then excluding frames which deviate considerably from the average measure. In a third preferred embodiment, this step is done by detecting outlier frames by using robust statistical method, as detailed in "A fast algorithm for the minimum covariance determinant estimator" by Rousseeuw et al. published in Technometrics, no. 41, pp. 212-223, 1999. The embodiments for step 370 are not limited to the three methods detailed above, and additional methods can be implemented to exclude frames providing less desired results. However, if step 372 is executed using the second or the third preferred embodiments, or any other embodiment that considers the frames themselves rather than the scoring results, step 372 is preferably performed prior to step 370, in order to reduce the time consumption of step 370 by scoring the feature vectors associated with only part of the frames against each model, rather than the feature vectors associated with all frames. Then, once the scoring of all feature vectors, or at least the feature vectors associated with relevant frames against the model are available, the total score representing the match between the speaker utterance and a specific model is determined at total score determination step 376. The score can be determined by a number of methods, including for example: choosing the score yielded by the frame having the highest score; taking an average of all scores; taking an average of the top predetermined part of the scores or the like. In a preferred embodiment of the disclosed invention, total score determination step 376 optionally includes also a score normalization procedure, in which one or more score-normalization methods, such as Z-norm, Top-normn, T-norm, or the like can be used. References for these methods can be found in: F. Bimbot et al., "A Tutorial on Text-Independent Speaker Verification," EURASIP Journal on Applied Signal Processing, vol. 4, pp. 430-451, 2004; and in: Y. Zigel and M. Wasserblat, "How to Deal with Multiple Targets in Speaker Identification systems?," Odyssey 2006 The Speaker and Language Recognition Workshop, San Juan, 2006, the contents of which are incorporated herein by reference. The total score is normalized using the normalization parameters associated with the model as initialized in step 336. Optionally, the total score is used for adapting the model normalization parameters in step 337, and enhancing the model stored in speaker models 321. Once the total scores of matching the speaker utterance against all target models are available, at max scoring step 378 it is determined which target model or models yielded the one or another predetermined number of highest scores, or a predetermined percentage of the highest scores. This is preferably performed by comparing the total scores, sorting them, and picking the highest score or scores. At score scaling and decision step 382, the score is optionally scaled in order to adjust the result to a range required by the operator. For example, a user may require that the results be in the range of 0-100 rather than any other range. The scaling can be performed in a variety of ways, comprising for example linear scaling according to the following formula:

$$s_n = \begin{cases} 0 & s < s_{min} \\ 100y & s_{min} < s < s_{max} \\ 100 & s > s_{max} \end{cases}$$

wherein $$y = 1 - \frac{\ln\left(1 + (100\alpha + 0.001) \cdot \left(1 - \frac{s - s_{min}}{s_{max} - s_{min}}\right)\right)}{\ln(1.001 + 100\alpha)}$$

and wherein: S is the score of a speaker utterance matched against a target set; $S_n$, is the scaled score; and $0 \leq \alpha \leq 1$, according to the required slope of the linear part of the graph showing the normalized score against the score. Other scaling schemes can be implemented, including but not limited to linear-in-part scaling, logarithmic, or the like.

It should be noted that preprocessing step 352, feature extraction step 356, summed calls handling step 360, gender detection step 364, and fast scoring step are performed once for each speaker utterance that is to be tested. All frame scoring step 370, frame quality testing step 372 and score determination step 376 are performed per speaker utterance and per target model (excluding the second and third embodiments of frame quality testing stage 372). Max scoring step 378 and score scaling and decision step 382 are also performed once per utterance. Once the total score is available and possibly normalized, it can be further determined at step 382 whether the speaker belongs to the target set, according to whether or not the total (possibly normalized) score exceeds the threshold ☐ or not. Threshold ☐ can have a predetermined value, or be dynamic, such as to include a certain percentage of the scores. At step 386, if the score exceeds ☐, the speaker is accepted to the target set and the identity of the one or more targets to which the utterance matches the most is provided and the speaker is rejected from the target set otherwise.

An additional optional stage is model normalization parameter adaptation step 337. At step 336, distribution parameters are coupled to the model generated at step 316, in order to normalize scores of matching an utterance against different models, in order to compare them on a more equal basis. At step 337 the normalization parameters are optionally updated, for adapting the model to the environment on an on-going basis. Step 337 is further detailed in association with FIG. 4 below.

Figure 4:
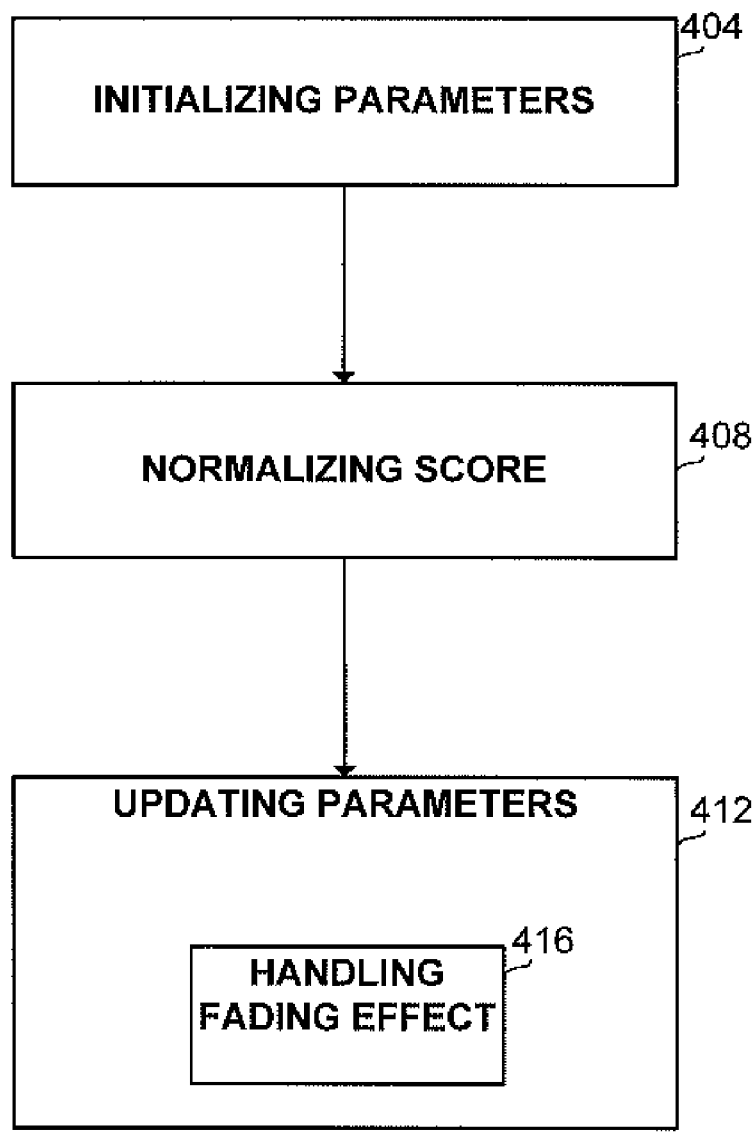
FIG. 4 is a flowchart showing the steps associated with normalizing the target models, in accordance with a preferred embodiment of the disclosed invention.

FIG. 4 shows the stages associated with normalizing the target models. At step 404, initial estimation of the normalization parameters is performed, preferably using scores of speech utterances from speakers known to be non-targets (hereinafter "development segments"). The initial estimation is performed when the models are constructed, during the training stage. At step 408, the score of a tested voice is normalized, using the currently available normalization parameters. At step 412, the normalization parameters are updated using the score of the tested voice. As part of parameter adaptation step 412, the fading effect, causing additional results to influence less than initial results is handled at step 416. The normalization parameters can be updated by using either the original score of the tested voice, or the normalized score, since the transformation between the original score and the normalized score is known. The model and score normalization process can be performed in a number of ways. Two exemplary embodiments are the Top-norm method and the Z-norm method. Both methods follow the steps discussed above. In the Top-norm method, the scores used for determining the parameters are the highest (e.g. the top predetermined percentage of the results of non-targets, such as 10%) scores of speakers known to be non-targets. Thus, in the Top-norm method, the parameters, for example the mean and standard-deviation of these highest scores (top-scores) are determined for each target-speaker model. In the Z-norm method the parameters are calculated from all the non-target scores. The Z-norm method assumes that the non-target score probability density function (PDF) is Gaussian, which is not always accurate. However, the right-hand-side tail of a non-target score distribution, such as area 232 of FIG. 2 may be considered substantially similar to a Gaussian tail, although the overall distribution is not a Gaussian. This is mainly but not only due to of the existence of different channels, handset devices, or other variations in the utterances for which the scores are determined and in some cases, both male and female utterances. Thus, the Z-norm method is sensitive to the existence of both male and female speakers in the target models. Hence, for the Z-norm method, a gender detector is optionally operated at step 340, similarly to gender detection step 364. For both the top-norm and the Z-norm methods, the larger the group of development-segments, the better is the estimation of the normalization parameters. Unfortunately, it is not always the case that a large database of development-segments exist a-priori, so the parameters may have to updated during on-going work. However, during on-going work it is not guaranteed that speakers identified as non-targets are such indeed. Yet, in a significant number of real-world applications, the percentage of targets is generally low, so using the score of any utterance matched against a model for normalization of the model itself still provides enhanced normalization parameters. The general idea relates to updating the existing parameters using the value obtained by a current score. Thus, the following schemes, or mathematical equivalents thereof is used for initializing and updating the normalization parameters of a model.

Initializing and Updating the Parameters Using the Z-Norm Method

Initializing the Parameters

The following explanation refers to step 404 of FIG. 4. The initial parameters used as a part of a model are the mean and variance of the scores belonging to speakers which are known to be non-targets, i.e., do not belong to the target set. Thus, the values are obtained by the following formulae:

$$\mu_L = \frac{1}{L} \sum_{l=1}^{L} s_l \text{ and}$$

$$\sigma_L^2 = E[(s-\mu_L)^2]$$
$$= E[s^2] - \mu_L^2$$
$$= \frac{1}{L}\sum_{l=1}^{L} s_l^2 - \mu_L^2,$$

wherein L is the number of available scores, which preferably ranges between a few tens and a number of thousands, and $S_l$ is the l-th score.

Updating the Parameters

Updating the parameters is performed in step 412 of FIG. 4. Then, when new results are available, it is required to update the mean and variance. Suppose the current results were obtained using L−1 scores, and the L-th score is now to be introduced. The current mean and variance, as determined by using L−1 scores are now denoted by $\mu_{L-1}$ and $\mu_{L-1}^2$, the current score is $s_L$, then the updated values are denoted by $\mu_L$, and $\sigma_L^2$, and can be determined by the following formulae:

$$\mu_L = \frac{1}{L}[(L-1)\mu_{L-1} + s_L] \text{ and}$$
$$\sigma_L^2 = \frac{L-1}{L}\left[\sigma_{L-1}^2 + \frac{1}{L}(\mu_{L-1} - s_L)^2\right]$$

Fading Effect Correction

Correcting the fading effect is optional, and performed at step 416 of FIG. 4. However, as L grows larger, a fading effect exists, which makes additional scores of lesser and lesser significance. A preferred methodology for solving this problem is fixating L as a predetermined number, for example 1000, and using L=1000 for all scores after the 1000-th score. However, other methodologies such as using different weights for later scores can be used.

Normalizing a Score

Normalizing a score is performed at step 408 of FIG. 4. When a new score is obtained, it is normalized using the normalization parameters, in order to be more comparable to scores obtained by matching the utterance to other models. The normalization can be performed using the following formulae:

$$s_{norm} = \frac{s-\mu}{\sigma}$$

wherein s is the score of matching the utterance against a specific model, $s_{norm}$ is the normalized score, and $\mu$ and $\sigma$ are the mean and standard-deviation, respectively, associated with the model.

Initializing and Updating the Parameters Using the Top-Norm Method:

Initializing the Parameters:

The parameters are initialized at step 404 of FIG. 4. When using the top-norm method, two sets are maintained for each model. The first set is similar to the Z-norm set, and comprises the parameters (L, $\mu$, $\sigma$) for all non-target scores, and ($L^{Top}$, $\mu^{Top}$, $\sigma^{Top}$) for the top predetermined percentage p (for example, 10%) of the scores. The initial parameters are determined by the following formulae:

$$\mu_L = \frac{1}{L}\sum_{l=1}^{L} s_l,$$
$$\sigma_L^2 = E[(s-\mu_L)^2] = E[s^2] - \mu_L^2 = \frac{1}{L}\sum_{l=1}^{L} s_l^2 - \mu_L^2$$

(as in the Z-norm method), and $$\mu_L^{Top} = \frac{1}{L}\sum_{l=1}^{L} s_l \text{ Where } s_l \in \text{Top } p\%$$
$$\sigma_L^{Top} = \sqrt{\frac{1}{L}\sum_{l=1}^{L} s_l^2 - (\mu_L^{Top})^2} \text{ Where } s_l \in \text{Top } p\%$$

wherein L is the number of scores, for example 400.

Updating the Parameters

Updating the parameters is performed at step 412 of FIG. 4. Suppose that the current parameters were obtained using L−1 scores, and are now to be updated using the L-th score, $S_L$.

First, $\sigma_L$ and $\mu_L$ are evaluated as follows, similarly to what is done in the Z-norm method:

$$\sigma_L = \sqrt{\frac{L-1}{L}\left[\sigma_{L-1}^2 + \frac{1}{L}(\mu_{L-1} - s_L)^2\right]}$$
$$\mu_L = \frac{1}{L}[(L-1)\mu_{L-1} + s_L]$$

Then, a threshold $\theta_L$ is evaluated. In a preferred non-limiting embodiment the threshold is evaluated according to the following formula:

$$\theta_L = \frac{\mu_L \sigma_{L-1}^{Top} + \mu_{L-1}^{Top} \sigma_L}{\sigma_L + \sigma_{L-1}^{Top}}$$

In a preferred embodiment of the disclosed invention, the scores upon which the parameters are determined, both initially and in consequent updates are not stored. Thus, the threshold can not be determined accurately but is rather estimated, and on each iteration a threshold correction procedure is performed in order to adjust the threshold to the required $L^{Top}/L$ ratio. Then, if $$L^{Top}/L > \frac{p}{100} \text{ AND } \theta_L < \theta_{L-1},$$

wherein $L^{Top}$ is the number of scores exceeding the threshold, then, $\theta_L = \theta_{L-1} + \alpha$, wherein $\alpha$ is a predetermined increment, for example $\alpha = 0.0001$. The idea is that if the threshold has dropped, while the number of top scores is beyond what it should be according to p, the threshold is increased. In an analogous manner, if $L^{Top}/L < p/100$ AND $\theta_L > \theta_{L-1}$, then the threshold should be decreased: $\theta_L = \theta_{L-1} - \alpha$, wherein $\alpha = 0.0001$ or any other constant.

Then, if $(s_L \geq \theta_L)$ i.e., the score is beyond the threshold, then $L^{Top}$ is increased and the parameters are updated using the following formulae:

$$L^{Top} = L^{Top} + 1$$

$$\sigma_L^{Top} = \sqrt{\frac{L^{Top}-1}{L^{Top}}\left[(\sigma_{L-1}^{Top})^2 + \frac{1}{L^{Top}}(\mu_{L-1}^{Top} - s_L)^2\right]}$$

$$\mu_L^{Top} = \frac{1}{L^{Top}}\left[(L^{Top}-1)\mu_{L-1}^{Top} + s_L\right]$$

Otherwise the parameters are maintained:

$$\mu_L^{Top} = \mu_{L-1}^{Top}$$

$$\sigma_L^{Top} = \sigma_{L-1}^{Top}$$

Fading Effect Correction

Fading effect is corrected at step 416 of FIG. 4. As more scores are gathered, the effect of new scores reduces, as detailed in association with the Z-norm above.

Normalizing a Score

The scores are normalized at step 408 of FIG. 4. When a new score is obtained, it is normalized using the adaptation parameters, in order to be more comparable to scores obtained by matching the utterance to other models. In an analogous manner to the Z-norm method, the score normalization can be performed using the following formulae:

$$s_{norm} = \frac{s - \mu^{Top}}{\sigma^{Top}}$$

wherein s is the score and $S_{norm}$ is the normalized score.

The present invention provides a method for enhanced open-set speaker identification, using a number of enhancements and improvements over a basic method of merely comparing a feature vector obtained from a voice to be tested against a collection of models. It will be apparent to a person having ordinary skill in the art that any combination of one or more of the improvements will provide enhanced results over the basic process, and a user can use any subset of the suggested improvements, including: summed calls handling, agent detection, Model normalization parameters determination and usage, quality evaluation of the input utterance, gender detection, fast scoring, frame quality testing, and score scaling. A possible enhancement, especially for environments that require real-that require real-time notification, can be that if at a certain point in the process, for example after matching a voice utterance against some of the models, the probability that the speaker belongs to the target set exceeds a predetermined threshold, an alert will be generated without completing the process, in order to save time. The disclosed method can also be used with slight changes for closed-set speaker identification. It will also be apparent that one or more of the shown steps can be implemented in multiple ways, and they are not limited to being implemented in the preferred methods shown above. Also, a user may add additional enhancements steps to any subset of the listed enhancements.

Figure 5:
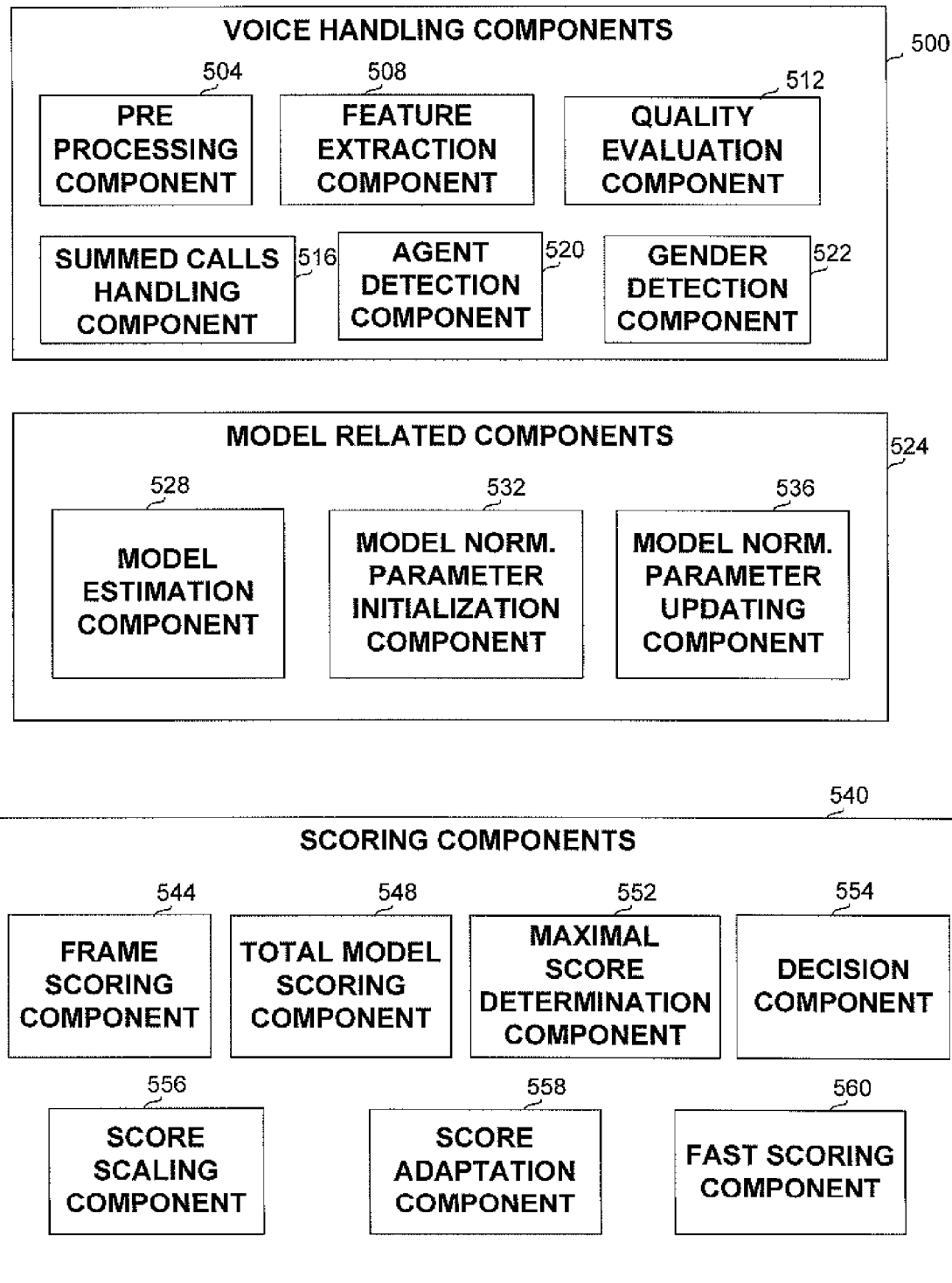
FIG. 5 is a schematic block diagram of the main components in a computerized system designed to perform the methods detailed in association with FIG. 3 and FIG. 4 above.
Figure 6:
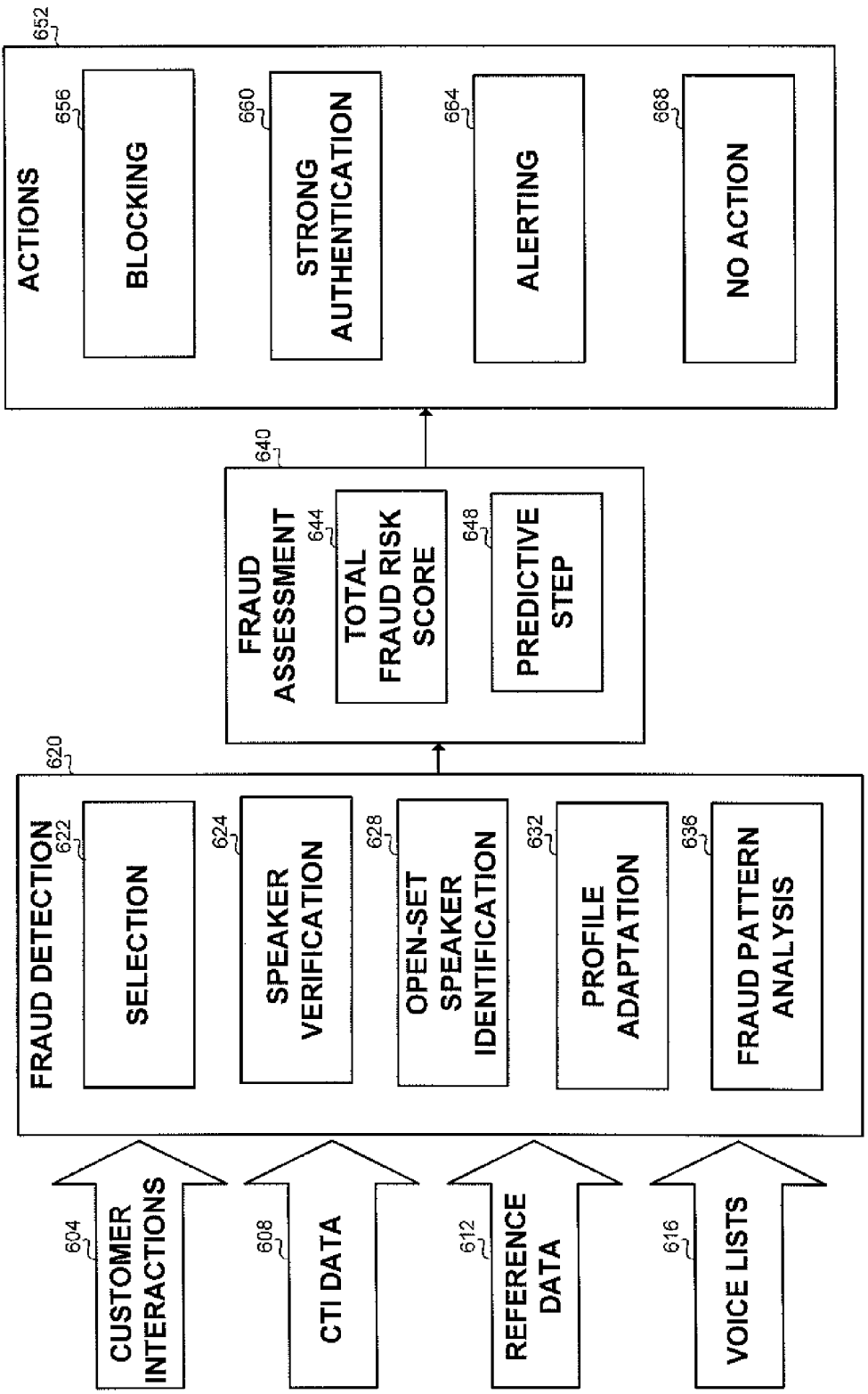
FIG. 6 is a schematic block diagram of a fraud detection system, using the speaker identification method and system of the disclosed invention.

Referring now to FIG. 5, showing the main components in a computerized system designed to perform the methods detailed in association with FIG. 4 above. The components are preferably run by speaker identification component 136 of FIG. 1. The components shown in FIG. 5 generally constitute instruction codes arranged in any required structures, such as executables, DLLs, routines, functions, methods or the like. The division into components discussed below is exemplary only and other divisions can be designed as well without deviating from the spirit of the disclosed invention. One or more of the components of FIG. 5 may be calling or otherwise referencing other components. The components implementing speaker identification generally include voice handling components 500, model related components 524 and scoring components 540. Voice handling components 500 comprise components for processing voice utterances, which are used for processing the voice utterances associated with the targets, as well as the tested utterances. Voice handling components 500 comprise pre processing component 504 for segmenting an input utterance and discarding low-quality, such as silent or noisy frames, as detailed in association with steps 304 and 352 of FIG. 3 above; feature extracting component 508 for extracting one or more features associated with one or more frame of the input utterance, as detailed in association with steps 308 and 356 of FIG. 3 above; and quality signal evaluation component 512 for determining an at least one quality measure associated with a part of the utterance, or with the utterance as a whole, as detailed whole, as detailed in association with step 358 of FIG. 3 above. Voice handling components 500 further comprise summed calls handling component 516 for separating input utterances in which two or more speakers are speaking into separate signals, as detailed in association with steps 312 and 360 of FIG. 3 above; agent detection component 520 identifies the agent side of the two or more signals generated by summed calls handling component 516, as detailed in association with step 314 of FIG. 3 above, and gender detection component 522 for determining whether a speaker in an utterance is more likely to be a male or a female, as detailed in association with steps 340 and 364 of FIG. 3 above. Model related components 524 comprise a model estimation component 528, for constructing a model characterizing a speaker out of the features available for that speaker, including data collected by voice handling components 500, such as gender, as detailed in association with step 316 of FIG. 3 above. Model related components 524 optionally further comprise a model normalization parameter initialization component 532 for initializing one or more parameters associated with the model and used for normalizing scores, as detailed in association with step 404 of FIG. 4 above. Another optional component of model related components 524 is model normalization parameter updating component 536, for updating the parameters associated with the model using one or more scores of a voice utterance against the model, as detailed in association with step 412 of FIG. 4 above. Yet another component group is scoring components 540, for handling the scoring of an utterance against a model. Components 540 comprise a frame scoring component 544 for scoring one or more features, preferably arranged as a vector against a model, as detailed in association with steps 368 and 370 of FIG. 3 above. Once feature scoring component 544 issued a score, total model scoring component 548 combines one or more scores associated with features of the utterance and the model into a total model score for the utterance. Maximal score determination component 552 determines the model for which a maximal score was yielded in association with a specific utterance, and decision component 554 determines whether the maximal score exceeds a predetermined threshold and an alert should therefore be generated. Components 540 further comprise score scaling component 556 for scaling the obtained maximal score to range in a predetermined range, and fast scoring component 560, for expediting the identification process by scoring features associated only with parts of the utterance against all models, and then scoring all features only against those models that yielded the highest score in the first phase. If model related components 524 comprise model normalization parameter initialization component 532 and model normalization parameter updating component 536, then scoring components 540 preferably comprise score adaptation component for adapting the scores using the model normalization parameters, as detailed in association with step 408 of FIG. 4 above. Referring now to FIG. 6, showing a flowchart of a fraud detection method, which uses the products of the disclosed speaker identification method. Often, speaker identification takes an important part in a fraud detection system. In fraud actions, a speaker is attempting an identity theft, i.e. pretends to be another, usually innocent, person. When the innocent person is known to the system, his voice print might be available, which enables comparison of the stored voice print and the caller and verifying the identity of the caller. However, this is not an option when the fraudster is not attempting to pretend he is a known person but uses a new name, or alternatively when no voice print is available for the innocent person. What can be done is to check whether the voice of the calling person belongs to a "black list" known to the system, the "black list" comprising voice print of persons known to be fraudsters. Thus, if a calling person not claiming to be associated with a person known to the system, and the probability that the person belongs to the black list exceeds a certain threshold, a more cautious handling can be exercised. The input to a fraud detection method comprises of customer interactions 604, from which voice prints to be checked are extracted, CTI data 608 which comprises meta data about the call, such as agent name, call time, call duration, calling number and the like. Yet another input is reference data 612, such as but not limited to textual information entered by the called person during the call, call subject or the like, and voice lists 616 comprising voice prints of existing customers, voice models of known fraudsters, or the like. The information, or available parts thereof is transferred to fraud detection step 620, comprising a number of sub steps. Within detection step 620, selection step 622 determines which operative steps are to be performed in the voice print. This can be decided upon factors such as calling number (some customers may have a secure line), time since last call, call type (for example a query may not necessitate identification, wherein a transfer of a large sum will). The available operative sub-steps comprise but are not limited to: speaker verification step 624, in which it is tested whether the speaker's voice matched the available voice print of the person he or she are claiming to be. This step requires the availability of the voice print. Detection step 620 further comprises open-set speaker identification step 628, as taught in the disclosed invention. The operativeness of this step requires the availability of black lists and voice prints or ready voice models of known fraudsters. Detection step 620 further comprises profile adaptation step 632, for adapting the voice print of known innocent customers. A person voice may change with time, so in order to maintain the speaker verification ability it might be required to update the voice print. Detection step 620 further comprises fraud pattern analysis step 636, for weighting additional information, such as CTI data, calling number and others. Each of verification step 624, speaker identification step 628 or pattern analysis step 636 provide a partial score indicating the probability that the calling person is a fraudster. Selection step 622 can also select to schedule steps 624, 628, 636, for example to first perform a speaker verification step 624, and only if the obtained likelihood is below a predetermined threshold, to perform speaker identification step 628. The partial scores are transferred to fraud assessment step 640, which comprises total fraud risk score 644, for providing a total risk factor, indicating the total likelihood that the calling person is a fraudster. Fraud assessment step 640 takes into account the partial scores from fraud detection steps 624 and possibly additional factors, such as the nature of the organization or varying requirements to generate the total risk factor. Fraud assessment step 640 further comprises predictive step 648 for assessing fraud trends, methods, or sources. By generating one or more models for predicting fraud, an organization can help weed out bad customers or other fraud sources and reduce its exposure to fraud. Once a total risk is estimated, one or more actions may be taken at step 652. The possible actions comprise: blocking 656 of the call and all subsequent actions, for example money transfer; stronger authentication 660, for further verifying the identity of the calking person; generating an alert 660, for example a visual, vocal or any other alert, including for example adding indications about the case to a database; or no action 664.

The present invention has been described using non-limiting detailed descriptions of embodiments thereof that are provided by way of example and are not intended to limit the scope of the invention. It should be understood that features described with respect to one embodiment may be used with other embodiments and that not all embodiments of the invention have all of the features shown in a particular figure or described with respect to one of the embodiments. It is noted that some of the above described embodiments may describe the best mode contemplated by the inventors and therefore include structure, acts or details of structures and acts that may not be essential to the invention and which are described as examples.

The present invention is not limited to what has been particularly shown and described hereinabove. Structure and acts described herein are replaceable by equivalents, which perform the same function, even if the structure or acts are different, as known in the art. The scope of the present invention is defined only by the claims which follow. When used in the following claims, the terms "comprise", "include", "have" and their conjugates mean "including but not limited to".

The invention claimed is:

1. A method for determining whether a speaker uttering a tested utterance belongs to a predetermined set comprising an at least one known speaker, wherein an at least one training utterance is available for each of the at least one known speaker, the method comprising:

extracting an at least one first feature of each of the at least one training utterance;

estimating an at least one model from the at least one first feature;

storing the at least one model within a storage device;

capturing a tested utterance by a capturing or logging unit;

extracting a second feature group from an at least one frame of the tested utterance;

fast-scoring a part of the second feature group against the at least one model, to obtain an at least one temporary model score;

determining an at least one fast model score using the at least one temporary model score;

selecting an at least one probable model associated with the at least one temporary model score which is higher than other temporary model scores;

scoring the second feature group against the at least one probable model, to obtain an at least one intermediate score;

determining an at least one model score using the at least one intermediate score;

selecting an at least one maximal score from the at least one model score; and the speaker is determined to belong to the predetermined set, if the at least one maximal score exceeds a threshold.

2. The method of claim 1 wherein the threshold is predetermined.

3. The method of claim 1 wherein the threshold is post determined.

4. The method of claim 1 further comprising a step of generating an alert when the speaker is determined to belong to the predetermined set.

5. The method of claim 1 wherein there are at least two voices belonging to at least two speakers in the tested utterance or the training utterance.

6. The method of claim 5 further comprising a step of summed call handling for separating the tested utterance or the training utterance of the at least two speakers.

7. The method of claim 6 further comprising a step of detecting an agent side within the at least two speakers.

8. The method of claim 1 further comprising a step of building an at least one background model.

9. The method of claim 8 further comprising steps of:
scoring the second feature group against the at least one background model to obtain an at least one background score; and
integrating the at least one model score with the at least one background score to enhance the model score.

10. The method of claim 1 further comprising a step of scaling the maximal score to be in a predetermined range.

11. The method of claim 1 further comprising a step of gender detection for the speaker or for the at least one known speaker.

12. The method of claim 1 wherein the part of the second feature group comprises features extracted from an initial part of the tested utterance.

13. The method of claim 1 further comprising steps of:
determining an at least one normalization parameter associated with each of the at least one model; and
normalizing the at least one model score using the at least one normalization parameter.

14. The method of claim 13 further comprising a step of updating the at least one normalization parameter using the at least one model score.

15. The method of claim 13 wherein the at least one normalization parameter is determined from at least two voice utterances uttered by one of the at least one known speaker.

16. The method of claim 13 wherein the at least one normalization parameter comprises the mean or the standard deviation of at least two scores associated with the at least one model.

17. The method of claim 13 wherein the at least one normalization parameter is determined from at least two model scores exceeding a second threshold.

18. The method of claim 13 wherein the at least one normalization parameter is determined from at least two model scores having a score belonging to a predetermined top percentage of a multiplicity of model scores.

19. The method of claim 1 further comprising a step of evaluating an at least one scalar measure related to the tested utterance.

20. The method of claim 1 wherein the model score is determined based on an at least one intermediate score having a value higher than at least one second intermediate score.

21. The method of claim 1 further comprising a preprocessing step for segmenting the tested utterance or the at least one training utterance and discarding an at least one frame of the tested utterance or the at least one training utterance.

22. The method of claim 1 when used within a fraud detection method.

23. The method of claim 1 further comprising:
a speaker verification step, for issuing a probability that the speaker is who he is claiming to be; and
a total fraud risk determination step for determining a total fraud risk based on the determination that the speaker belongs to the predetermined set and on the probability that the speaker is who he is claiming to be.

24. An apparatus for determining whether a speaker uttering a tested utterance belongs to a predetermined set comprising an at least one known speaker, wherein an at least one training utterance is available for each of the at least one known speaker, the apparatus comprising:
a feature extraction component for extracting a feature group of the tested utterance or of each of the at least one training utterance;
a fast scoring component for scoring a part of the feature group associated with part of the tested utterance against an at least one model for obtaining a fast intermediate score, determining an at least one fast model score using the fast intermediate score, and selecting an at least one probable model associated with a fast intermediate score which is higher than other fast intermediate scores;
a frame scoring component for scoring the feature group against an at least one probable model, to obtain an at least one intermediate score;
a total model scoring component for determining an at least one model score using the at least one intermediate score; and
a maximal score determination component for selecting a maximal score from the at least one model score.

25. The apparatus of claim 24 further comprising a model estimation component for estimating the at least one model.

26. The apparatus of claim 24 further comprising a summed call handling component for separating the tested utterance or the training utterance to at least two speakers.

27. The apparatus of claim 26 further comprising an agent detection component for detecting an agent side within the at least two speakers.

28. The apparatus of claim 27 further comprising a score scaling component for scaling the maximal score to be in a predetermined range.

29. The apparatus of claim 24 further comprising a gender detection component for determining whether a speaker in the tested utterance or in the at least one training utterance is a male or a female.

30. The apparatus of claim 24 further comprising a model normalization parameter initialization component, for evaluating an at least one parameter associated with a model.

31. The apparatus of claim 30 further comprising a model normalization parameter update component, for updating the at least one parameter associated with a model.

32. The apparatus of claim 30 further comprising a score adaptation component for adapting an at least one model score using an at least one model normalization parameter.

33. The apparatus of claim 24 further comprising a decision component for determining according to the maximal score whether the speaker uttering the tested utterance belongs to the predetermined set.

34. The apparatus of claim 24 further comprising a quality evaluation component for determining an at least one quality measure associated with an at least one part of the tested utterance.

35. The apparatus of claim 24 further comprising an alert generation component for issuing an alert when the speaker uttering the tested utterance is determined to belong to the predetermined set.

36. The apparatus of claim 24 further comprising a capturing or logging component for capturing or logging the tested utterance.

37. The apparatus of claim 24 further comprising a fraud detection component for determining a probability that the speaker is a fraudster.

38. A computer readable storage medium containing a set of instructions for a general purpose computer, the set of instructions comprising:
- extracting an at least one first feature of each of an at least one training utterance, each of the at least one training utterance uttered by a person belonging to a target set;
- estimating an at least one model from the at least one first feature, the model associated with the person belonging to the target set;
- extracting a second feature group from an at least one frame of a tested utterance;
- fast-scoring a part of the second feature group against the at least one model, to obtain an at least one temporary model score;
- determining an at least one fast model score using the at least one temporary model score;
- selecting an at least one probable model associated with the at least one temporary model score which is higher than other temporary model scores;
- scoring the second feature group against the at least one probable model, to obtain an at least one intermediate score;
- determining a model score using the at least one intermediate score;
- selecting a maximal score from the at least one model score; and
- determining whether a speaker of the tested utterance belongs to the target set.

39. The apparatus of claim 24 wherein the part of the feature group comprises features extracted from an initial part of the tested utterance.

* * * * *